US012366106B1

(12) United States Patent
Shadracks

(10) Patent No.: US 12,366,106 B1
(45) Date of Patent: Jul. 22, 2025

(54) FOLDABLE VENTILATED GARAGE DOOR PANEL

(71) Applicant: Frederick Shadracks, Frisco, TX (US)

(72) Inventor: Frederick Shadracks, Frisco, TX (US)

( * ) Notice: Subject to any disclaimer, the term of this patent is extended or adjusted under 35 U.S.C. 154(b) by 0 days.

(21) Appl. No.: 18/662,160

(22) Filed: May 13, 2024

(51) Int. Cl.

| | |
|---|---|
| ***E06B 3/48*** | (2006.01) |
| ***E05D 15/26*** | (2006.01) |
| ***E06B 7/04*** | (2006.01) |
| ***E06B 9/52*** | (2006.01) |
| *E06B 3/70* | (2006.01) |

(52) U.S. Cl.
CPC ............ *E06B 3/483* (2013.01); *E05D 15/262* (2013.01); *E06B 3/485* (2013.01); *E06B 7/04* (2013.01); *E06B 9/52* (2013.01); *E05Y 2900/106* (2013.01); *E06B 2003/7044* (2013.01)

(58) Field of Classification Search
CPC ......... E05D 15/262; E06B 7/04; E06B 3/485; E06B 3/483; E06B 2003/7044; E06B 9/52; E05Y 2900/106
USPC .................................................... 49/197–199
See application file for complete search history.

(56) References Cited

U.S. PATENT DOCUMENTS 2,330,696 A * 9/1943 Exiner .................... E06B 3/481 160/217
2,771,133 A * 11/1956 Haskell ................... E06B 3/483 160/187
3,178,776 A * 4/1965 Stansberry ............ E06B 3/7001 52/762
3,927,709 A * 12/1975 Anderson ............... E05D 15/24 160/180
4,039,018 A * 8/1977 De Maria ................. E06B 3/52 49/63
4,141,403 A * 2/1979 Church ................... E05D 15/24 160/201
4,378,043 A * 3/1983 Sorenson .................. E06B 7/03 160/97
4,537,237 A * 8/1985 Sepulveda .............. E05D 15/24 160/116
4,653,566 A * 3/1987 Miale ........................ E06B 9/52 160/113
4,770,087 A * 9/1988 Danley ................... E06B 7/082 49/168
5,363,898 A * 11/1994 Sprague .............. E05D 13/1276 160/98
5,611,382 A * 3/1997 Sferra ....................... E06B 9/52 160/113

(Continued)

*Primary Examiner* — Justin B Rephann

(57) ABSTRACT

A panel in an overhead door system having a rigid outer frame with an aperture therethrough dimensioned to receive a plurality of movable, foldable horizontally hinged sub-panels dimensioned to fit within confines of the aperture of such outer frame when closed and a plurality of movable, foldable horizontally hinged sub-panels dimensioned to fit within the confines of the aperture of such outer frame when closed, said sub-panels being an upper sub-panel, a first sub-panel, a second sub-panel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel and including a pin, roller or track system.

11 Claims, 8 Drawing Sheets

(56) References Cited

U.S. PATENT DOCUMENTS

| | | | | |
|---|---|---|---|---|
| 5,848,630 | A * | 12/1998 | Manzo | E06B 5/10 160/113 |
| 5,860,465 | A * | 1/1999 | Eastridge | E06B 3/485 160/113 |
| 5,904,199 | A * | 5/1999 | Messner | E06B 3/485 160/219 |
| 5,976,009 | A * | 11/1999 | Achen | E06B 7/082 52/198 |
| 6,092,580 | A * | 7/2000 | Lucas | E06B 3/485 160/113 |
| 6,209,613 | B1 * | 4/2001 | Forry | E06B 9/0638 49/129 |
| 6,386,969 | B1 * | 5/2002 | O'Brien | F24F 11/0001 454/343 |
| 6,715,527 | B2 * | 4/2004 | Ardoin | E06B 7/086 160/113 |
| 7,143,803 | B2 * | 12/2006 | Mitchell | E06B 3/485 160/113 |
| 7,169,038 | B1 * | 1/2007 | Vignau | E06B 7/02 454/333 |
| 7,484,286 | B2 * | 2/2009 | Fowler | E06B 9/52 160/113 |
| 9,080,379 | B2 * | 7/2015 | Guillemette | E05D 15/262 |
| 9,163,845 | B1 * | 10/2015 | Carlozzi | F04D 29/582 |
| 9,512,668 | B1 * | 12/2016 | Nissan | E04F 10/08 |
| 9,605,479 | B2 * | 3/2017 | Muto | E06B 3/485 |
| 9,719,290 | B1 * | 8/2017 | Arroyo | E06B 3/485 |
| 9,957,753 | B2 * | 5/2018 | Amsellem | E06B 9/52 |
| 10,208,528 | B2 * | 2/2019 | Sebastian | E06B 3/483 |
| 10,413,106 | B1 * | 9/2019 | Valeriano | A47G 29/141 |
| 10,512,351 | B1 * | 12/2019 | Valeriano | E05B 47/0001 |
| 10,975,613 | B2 * | 4/2021 | Taylor | E05F 15/77 |
| 11,649,665 | B1 * | 5/2023 | Earnest | E06B 3/485 52/211 |
| 12,203,681 | B2 * | 1/2025 | Ansari | B01D 46/10 |
| 2003/0106652 | A1 * | 6/2003 | Ardoin | E06B 7/086 160/113 |
| 2003/0221803 | A1 * | 12/2003 | Forsland | E06B 3/5892 160/229.1 |
| 2004/0250967 | A1 * | 12/2004 | Dorest | E06B 9/52 160/180 |
| 2006/0289127 | A1 * | 12/2006 | Fowler | E06B 9/52 160/180 |
| 2009/0084507 | A1 * | 4/2009 | Tescher | F24F 6/043 160/113 |
| 2015/0308182 | A1 * | 10/2015 | Gionta | E06B 9/52 160/92 |
| 2018/0266169 | A1 * | 9/2018 | Wray | E05F 15/70 |
| 2021/0045564 | A1 * | 2/2021 | Duckers | E06B 3/483 |

* cited by examiner

FOLDABLE VENTILATED GARAGE DOOR PANEL

CROSS REFERENCE TO RELATED APPLICATION

Not applicable.

TECHNICAL FIELD

The present invention relates to overhead doors, such as garage doors.

BACKGROUND

Panel overhead or garage doors trace back to the early 20th century when automobiles began to become a common household possession. With the rise of automobiles, homeowners needed a secure and convenient way to store their vehicles. In response, the first garage doors were typically made of wood and consisted of a single panel that swung outward or upward on hinges. These doors were manually operated and often lacked insulation.

As technology advanced, sectional garage doors started to emerge. Instead of a single panel, these doors were made up of several horizontal sections hinged together. This design allowed for smoother operation and better utilization of space, as the door could slide upward along tracks when opened. However, these early sectional doors were still primarily made of wood.

The introduction of steel revolutionized garage door manufacturing. Steel panels offered increased durability, security, and resistance to the elements compared to wood. These advancements led to the widespread adoption of steel sectional garage doors, which became the standard for residential garage doors.

With the growing emphasis on energy efficiency, manufacturers began incorporating insulation into garage doors. Insulated panels helped to regulate temperature inside the garage, making it more comfortable and energy-efficient. Additionally, advancements in design and materials allowed for a wider range of styles and colors to suit various architectural preferences.

Modern garage doors often come equipped with remote-controlled openers, allowing for convenient operation from inside the vehicle. Furthermore, smart garage door openers enable homeowners to monitor and control their garage doors remotely using smartphone apps. Additionally, materials such as aluminum and fiberglass are gaining popularity due to their lightweight nature and resistance to rust and corrosion.

With advancements in technology and modern living, many homeowners use their garages for more than storing automobiles. Disadvantageously, garages are rarely air conditioned or ventilated meaning excess heat and unhealthy automobile exhaust fumes therein. The fear of intruders from animals and humans and the lack of privacy have led to many homeowners to close their garage doors regardless of how hot or polluted the garage space might be. What is desired is a more efficient and effective garage door panel that allows ventilation and natural lighting while keeping out insects, pests, and intruders.

SUMMARY

The invention is a panel system that is part of a garage door, the garage door itself being comprised of a plurality of sectional panels, the panel system being comprised of a rigid outer frame with an aperture therethrough, a plurality of movable, foldable horizontally hinged sub-panels positioned within confines of the aperture of such outer frame, at least one screen, and associated hardware, actuators, struts, guides, rails and track system. Alternatively, the sub-panels can be vertically hinged.

The invention can include interchangeable and easily replaceable sub-panels that are movable along a track system and can interlock or close to prevent air movement and open, slide, or fold to allow ventilation. The invention further includes an interchangeable and easily replaceable mesh or screen that inhibits insect or pest access when the sub-panels are in an opened position. The sub-panels can be comprised of or include an insulating material with a predetermined thermal resistance or R-value to reduce thermal or sound energy therethrough. The sub-panels can have a layered composite construction, with different materials layered during sub-panel fabrication. The sub-panels can be manufactured having a variety of form factors. The sub-panels can include materials independently selected from plastic, glass, aluminum alloy, aluminum composite, carbon fiber, and steel. The sub-panels can be fabricated of or include a thermoplastic resin, resin-reinforced fiberglass, carbon fiber reinforced plastic, clear or tinted glass materials, or a composite or a combination thereof. The sub-panels can be comprised of or include solar panels that can be used to, inter alia, power active ventilation of the building structure.

The sub-panel operating mechanism can include mechanisms to be operated manually and automatically, including a pair of actuator arms that can lift, slide, or fold sub-panels into a stack within the embedded tracks/rails in the panel frame. Alternatively, the sub-panel operating mechanism can comprise a sub-panel strut. The sub-panel strut uses compressed gas to assist in lifting and holding the sub-panel in a controlled manner and is designed to provide support and stability to the sub-panel while allowing for smooth and gradual opening and closing movements.

Although the principles of the invention are described with respect to overhead or residential garage doors, and it is particularly advantageous in such usage, it should be understood that this is merely by way of example and that the invention has equal application for any panel doors and can be applied to other types of buildings, such as in sheds, storage facilities, airplane hangars, equipment storage buildings, and warehouses. To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE FIGURES

For a better understanding of the present invention including the features, advantages and specific embodiments, reference is made to the following detailed description along with accompanying Figures, in which.

DETAILED DESCRIPTION

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention. The principal objective of this invention is to provide a secure garage door panel operable to provide ventilation and natural lighting controllable by the movement of sub-panels within embedded tracks/rail systems in the panel.

An aspect of the invention provides a door panel whose frame includes a large aperture(s), sub-panels, and embedded tracks/rails system that supports the opening and closing of the aperture(s) for ventilation and natural lighting by the combined movement of the sub-panels without impeding the normal action of closing or opening a garage door system in an existing or new building structure. This invention aims to improve ventilation and natural lighting and the repurposed use of a structure while regulating the entry of insects, pests, and unwanted intruders into the structure.

Figure 1:
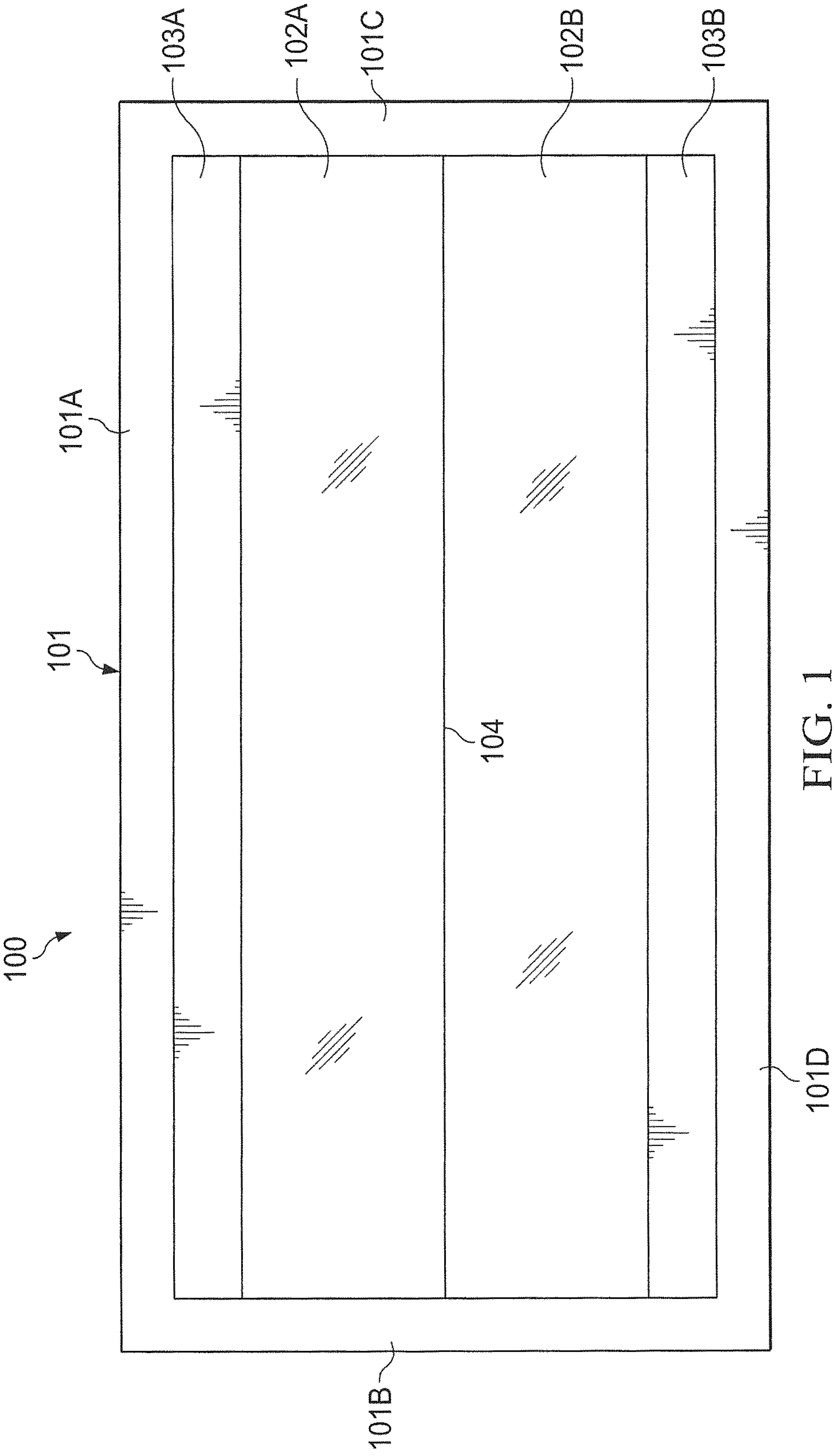
FIG. 1 is a front view of an aspect of the invention in a closed position.
Figure 2:
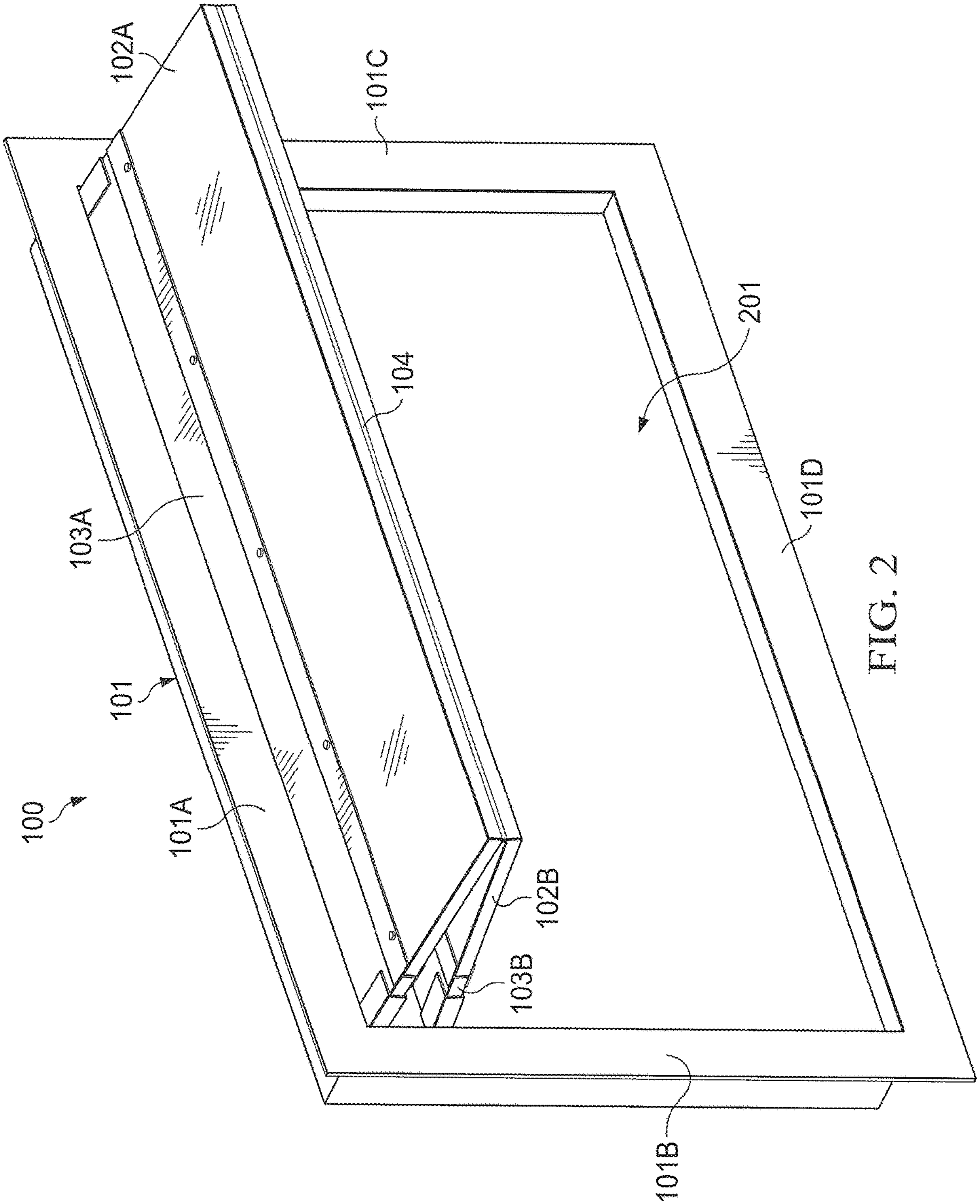
FIG. 2 is a left-side perspective view of the invention in an open position.
Figure 6:
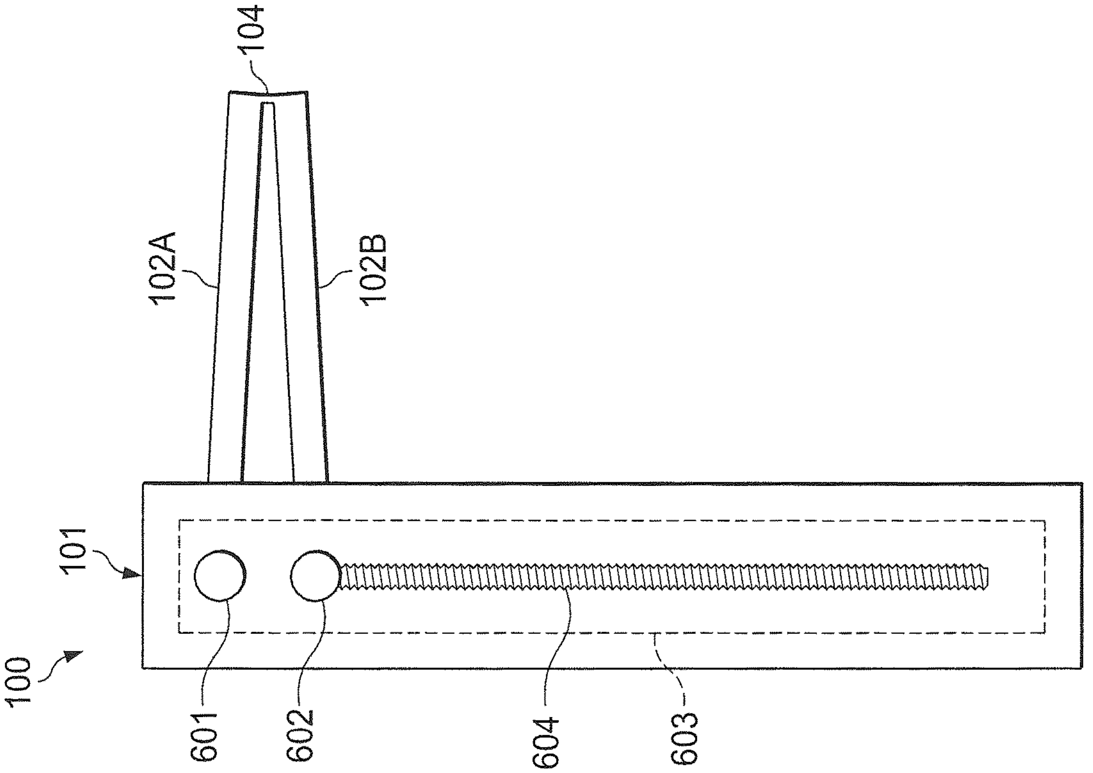
FIG. 6 is a cutaway side view of the invention in the open position showing the tracks.

Referring now to the Figures, FIG. 1 is a front view of an aspect of the invention 100 in a closed position. A rigid outer frame 101 with an aperture 201 (as seen in FIG. 2) therethrough is dimensioned to receive a plurality of movable, foldable horizontally hinged sub-panels 102A, 102B, 103A, 103B dimensioned to fit against the outline of aperture 201 of rigid outer frame 101 when closed. Rigid outer frame 101 includes a top horizontal member 101A, a left vertical member 101B, a right vertical member 101C and a bottom horizontal member 101D. Horizontal lengthwise hinge 104 couples sub-panel 102A to sub-panel 102B. Upper sub-panel 103A is coupled to outer frame 101 via a rotatable coupler that couples the left side of upper sub-panel 103A to left vertical member 101B as seen in FIG. 6. The rotatable coupler can be a pin extending from the left side of upper panel 103A into an aperture proximate the upper end of left vertical member 101B that allows the upper sub-panel 103A and hence sub-panel 102A to articulate with respect to outer frame 101. Similarly, the right side of upper sub-panel 103A is coupled to outer frame 101 via a similar coupler such as a pin and aperture that couples the right side of upper sub-panel 103A to right vertical member 101C.

Lower sub-panel 103B includes a lower pin or roller 602 on each end thereof that is confined in a track or rail 603 (as seen in FIG. 6) to allow lower sub-panel 103B and hence sub-panel 102B to move with respect to outer frame 101. Horizontal hinge 104 between sub-panel 102A and sub-panel 102B allows the sub-panels to articulate with respect to each other. For example, horizontal hinge can be a flexible, resilient material such as plastic, a piano hinge, a plurality of metal hinges and the like. For example, the hinge can be a continuous hinge (also known as a "continuous piano hinge" or "continuous geared hinge"). This is similar to a piano hinge. This type of hinge runs the entire length of the sub-panels, providing continuous support and smooth operation. Alternatively, it can be a butt hinge. Butt hinges are a traditional type of hinge consisting of two rectangular plates joined by a pin. The hinge can be a strap hinge. A strap hinge features a long, flat strap that extends from the panel to the frame or support structure. Finally, the hinge can be a barrel hinge. Barrel hinges consist of a central cylinder (barrel) with protruding pins that fit into corresponding holes. These would be used if the desire is for the sub-panels to swing in both directions. Hidden hinges, also known as concealed hinges, are installed inside the sub-panel, making them invisible from the outside When lower sub-panel 103B is moved in an upward motion via the interaction of the lower pins or rollers 602 within the track or rails, it causes either an outward or inward (depending on the design) repositioning of sub-panel 102A with respect to sub-panel 102B such that they fold. The motion of the sub-panels 102A, 102B with respect to each other can be described as folding. When invention 100 is to be opened, the lower sub-panel 103B moves along a track with sub-panel 102B in a coordinated manner, rolling upwards until the invention 100 is fully open. Similarly, when closing, the lower sub-panel 103B and sub-panel 102B move downward in a synchronized fashion until the invention is closed. This motion is guided by pins, or rollers along the tracks, ensuring smooth operation and alignment of the panels throughout the opening and closing process.

Rigid outer frame 101 can be fabricated from aluminum, steel, metal alloy, wood or similar rigid material. Steel garage doors are popular due to their durability, security, and relatively low maintenance requirements. The outer frame can be made in a variety of styles and finishes, including smooth, textured, and embossed designs. An aluminum outer frame is advantageously lightweight, resistant to rust and corrosion, and is sufficiently robust to receive the subpanels.

The sub-panels 102A, 102B, 103A, 103B can be manufactured having a variety of form factors. The sub-panels 102A, 102B, 103A, 103B can include materials independently selected from plastic, glass, aluminum alloy, aluminum composite, carbon fiber, and steel. The sub-panels 102A, 102B, 103A, 103B can be fabricated of or include a thermoplastic resin, resin-reinforced fiberglass, carbon fiber reinforced plastic, clear or tinted glass materials, or a composite or a combination thereof. The sub-panels 102A, 102B can be comprised of or include solar panels that can be used to, inter alia, power active ventilation of the building structure.

In an alternative embodiment, the sub-panels can be vertically hinged so as to allow the sub-panels to be opened using a track or rail system along upper horizontal member 101A and lower horizontal member 101B.

FIG. 2 is a left-side perspective view of the invention 100 in an open position. Rigid outer frame 101 has an aperture 201 therethrough dimensioned to receive the plurality of movable, foldable horizontally hinged sub-panels 102A, 102B, 103A, 103B dimensioned to fit within confines of the aperture of such outer frame 101 when closed. Rigid outer frame 101 includes a top horizontal member 101A, a left vertical member 101B, a right vertical member 101C and a bottom horizontal member 101D. Horizontal lengthwise hinge 104 couples sub-panel 102A to sub-panel 102B. Upper sub-panel 103A is coupled to outer frame 101 via a rotatable coupler that couples the left side of upper sub-panel 103A to left vertical member 101B as seen in FIG. 6. The rotatable coupler can be a pin extending from the left side of upper panel 103A into an aperture proximate the upper end of left vertical member 101B that allows the upper sub-panel 103A and hence sub-panel 102A to articulate with respect to outer frame 101. Similarly, the right side of upper sub-panel 103A is coupled to outer frame 101 via a similar coupler such as a pin and aperture that couples the right side of upper sub-panel 103A to right vertical member 101C.

Lower sub-panel 103B includes a lower pin or roller 602 on each end thereof that is confined in a track or rail 603 (as seen in FIG. 6) to allow lower sub-panel 103B and hence sub-panel 102B to move with respect to outer frame 101. Horizontal hinge 104 between sub-panel 102A and sub-panel 102B allows the sub-panels to articulate with respect to each other.

Figure 3:
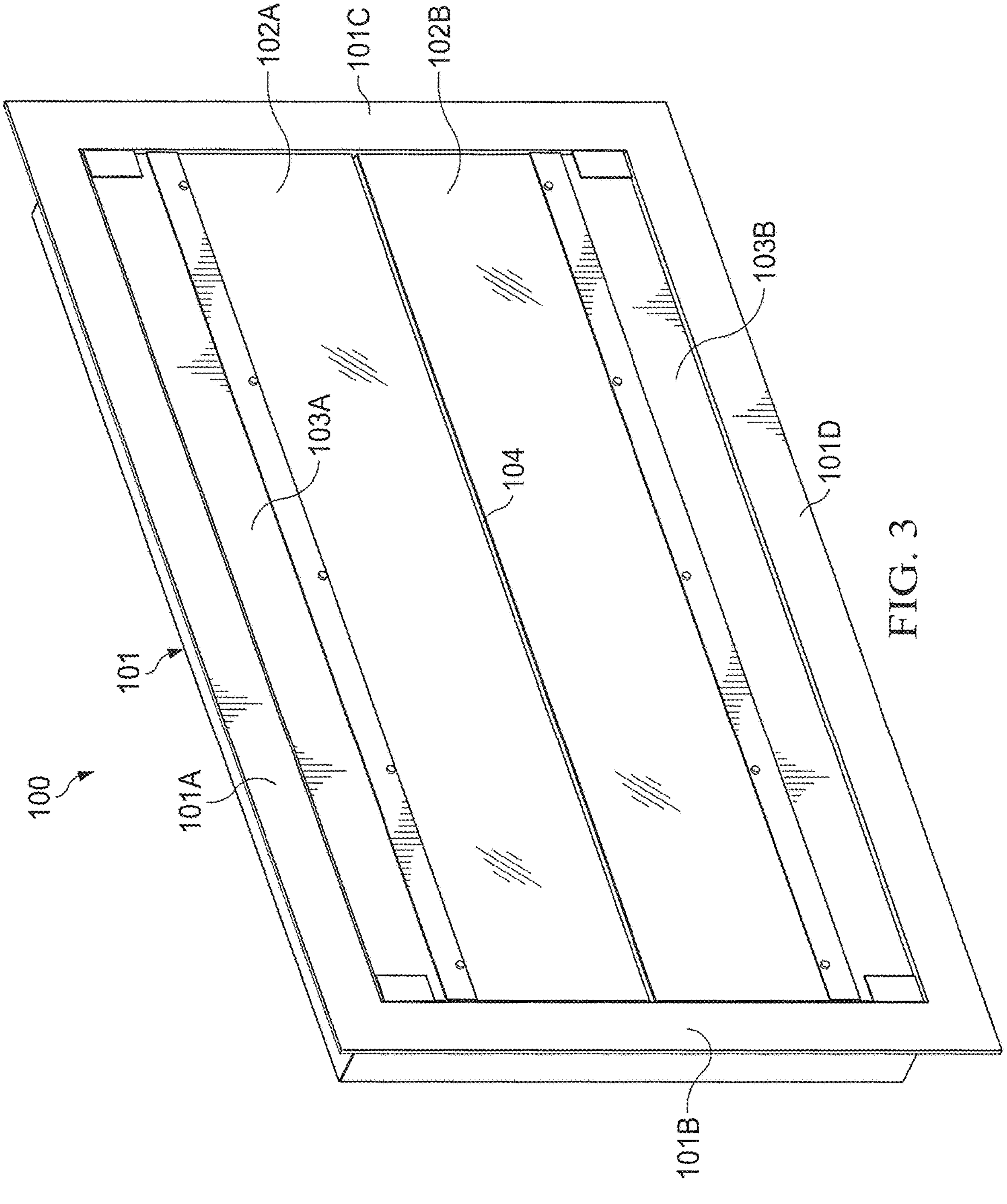
FIG. 3 is a left-side perspective view of the invention in a closed position.

FIG. 3 is a left-side perspective view of the invention 100 in a closed position. As noted herein, rigid outer frame 101 has an aperture 201 therethrough dimensioned to receive the plurality of movable, foldable horizontally hinged sub-panels 102A, 102B, 103A, 103B dimensioned to fit within confines of the aperture of such outer frame 101 when closed. Rigid outer frame 101 includes a top horizontal member 101A, a left vertical member 101B, a right vertical member 101C and a bottom horizontal member 101D. Horizontal lengthwise hinge 104 couples sub-panel 102A to sub-panel 102B. Upper sub-panel 103A is coupled to outer frame 101 via a rotatable coupler that couples the left side of upper sub-panel 103A to left vertical member 101B as seen in FIG. 6. The rotatable coupler can be a pin extending from the left side of upper panel 103A into an aperture proximate the upper end of left vertical member 101B that allows the upper sub-panel 103A and hence sub-panel 102A to articulate with respect to outer frame 101. Similarly, the right side of upper sub-panel 103A is coupled to outer frame 101 via a similar coupler such as a pin and aperture that couples the right side of upper sub-panel 103A to right vertical member 101C.

Lower sub-panel 103B includes a lower pin or roller 602 on each end thereof that is confined in a track or rail 603 (as seen in FIG. 6) to allow lower sub-panel 103B and hence sub-panel 102B to move with respect to outer frame 101. Horizontal hinge 104 between sub-panel 102A and sub-panel 102B allows the sub-panels to articulate with respect to each other.

Figure 4:
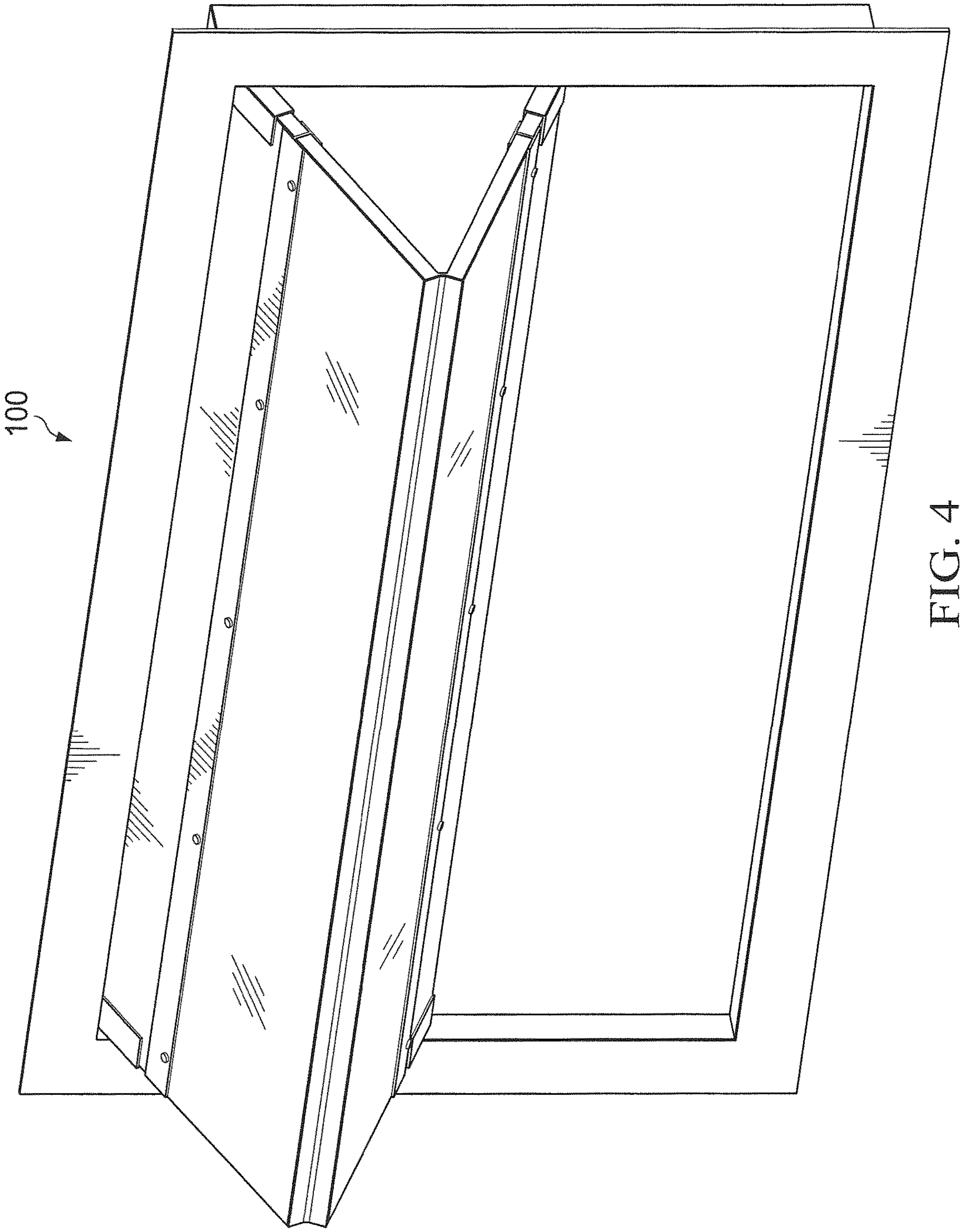
FIG. 4 is a right-side perspective view of the invention in a partially opened position.
Figure 5:
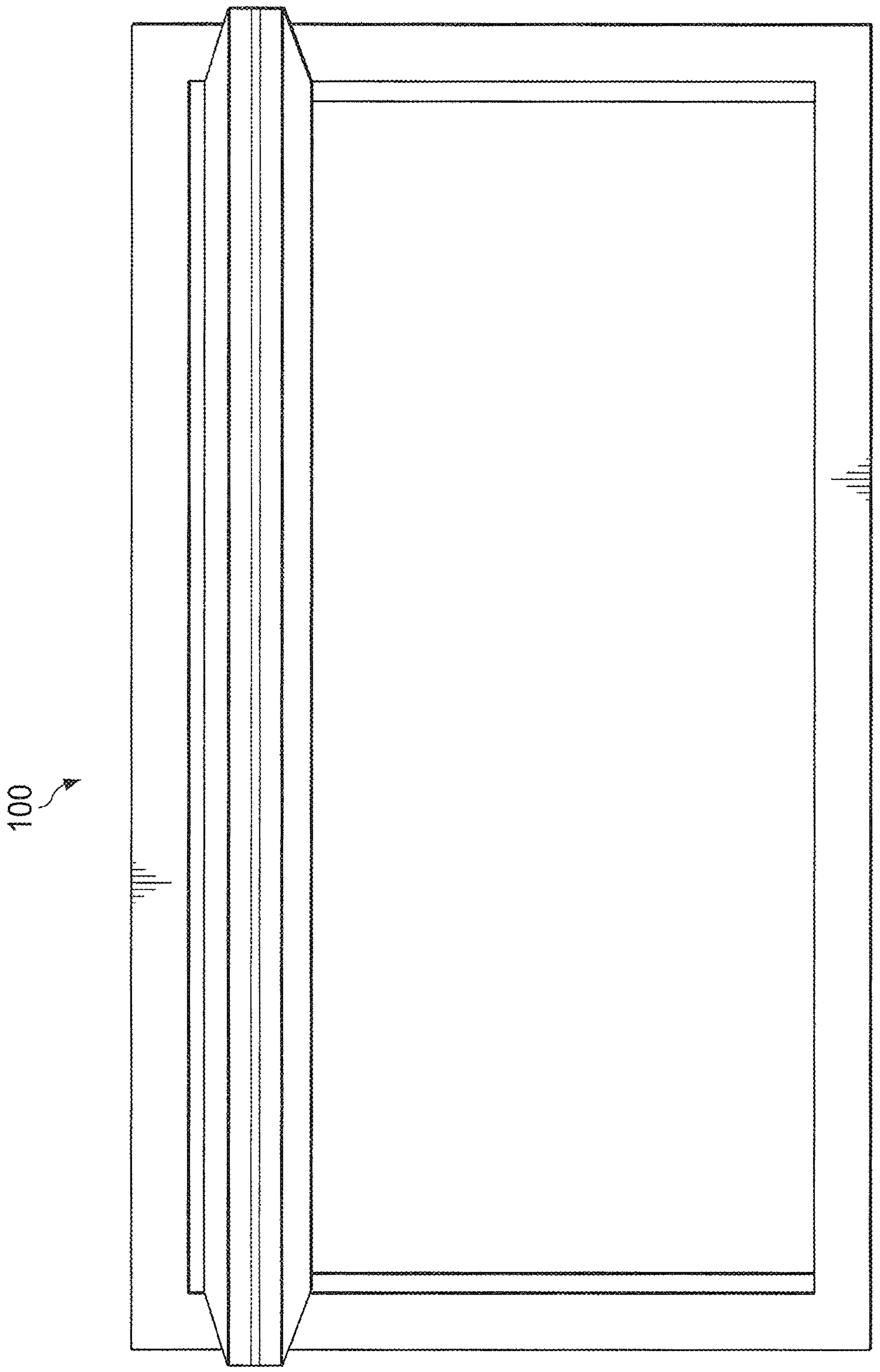
FIG. 5 is a front view of an aspect of the invention in an open position.

FIG. 4 is a right-side perspective view of the invention 100 in a partially opened position and FIG. 5 is a front view of an aspect of the invention 100 in an open position.

FIG. 6 is a cutaway side view of the left side of invention 100 in the open position showing the rotatable coupler 601 (there is a corresponding rotatable coupler on the right side) lower pin or roller 602, track or rail 603 along which the lower pin or roller 602 is guided and screwjack mechanism 604. In lieu of the screwjack holding the sub-panels in place, the sub-panels can be manually raised and then locked in position with a locking mechanism coupling portion of a sub-panel to the rigid outer frame 101. From the view of FIG. 6, the rigid outer frame 101, sub-panels 102A, 102B, and hinge 104 can be seen. The rotatable coupler 601 can be a pin extending from the left side of upper panel 103A into an aperture proximate the upper end of left vertical member 101B that allows the upper sub-panel 103A and hence sub-panel 102A to articulate with respect to outer frame 101. Similarly, the right side of upper sub-panel 103A is coupled to outer frame 101 via a similar coupler such as a pin and aperture that couples the right side of upper sub-panel 103A to right vertical member 101C. Lower sub-panel 103B includes a lower pin or roller 602 on each end thereof that is confined in a track or rail 603 to allow lower sub-panel 103B and hence sub-panel 102B to move with respect to outer frame 101. Horizontal hinge 104 between sub-panel 102A and sub-panel 102B allows the sub-panels to articulate with respect to each other.

Figure 7:
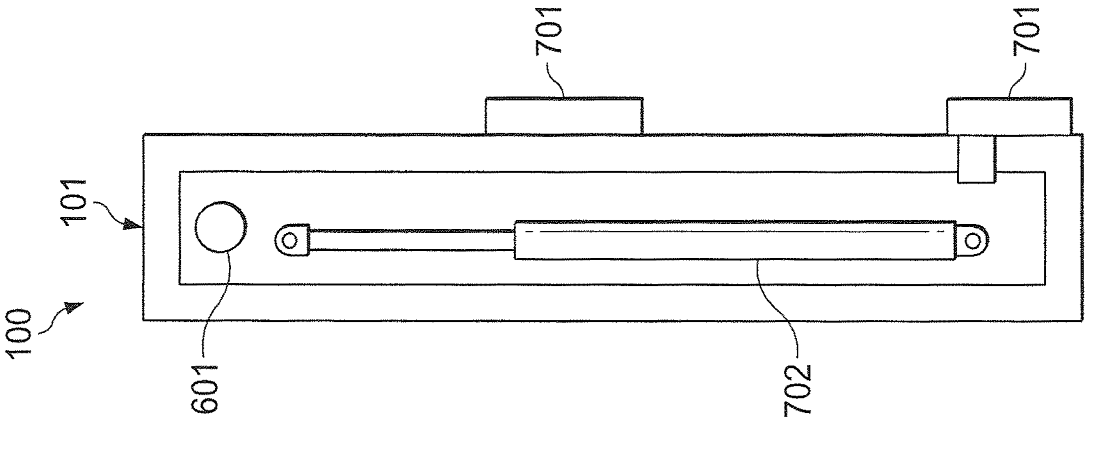
FIG. 7 is a cutaway side view of the invention in the closed position showing the tracks.

FIG. 7 is a cutaway side view of invention 100 in the closed position showing the tracks, locking mechanism 701 (which can be located, inter alia, between first sub-panel 102A and second sub-panel 102B or between lower sub-panel 103B and the rigid outer frame), and strut 701. Strut 702 can be a gas filled strut coupled between any of the sub-panels and the rigid outer frame 101 to assist in moving the sub-panels into a desired position.

Figure 8:
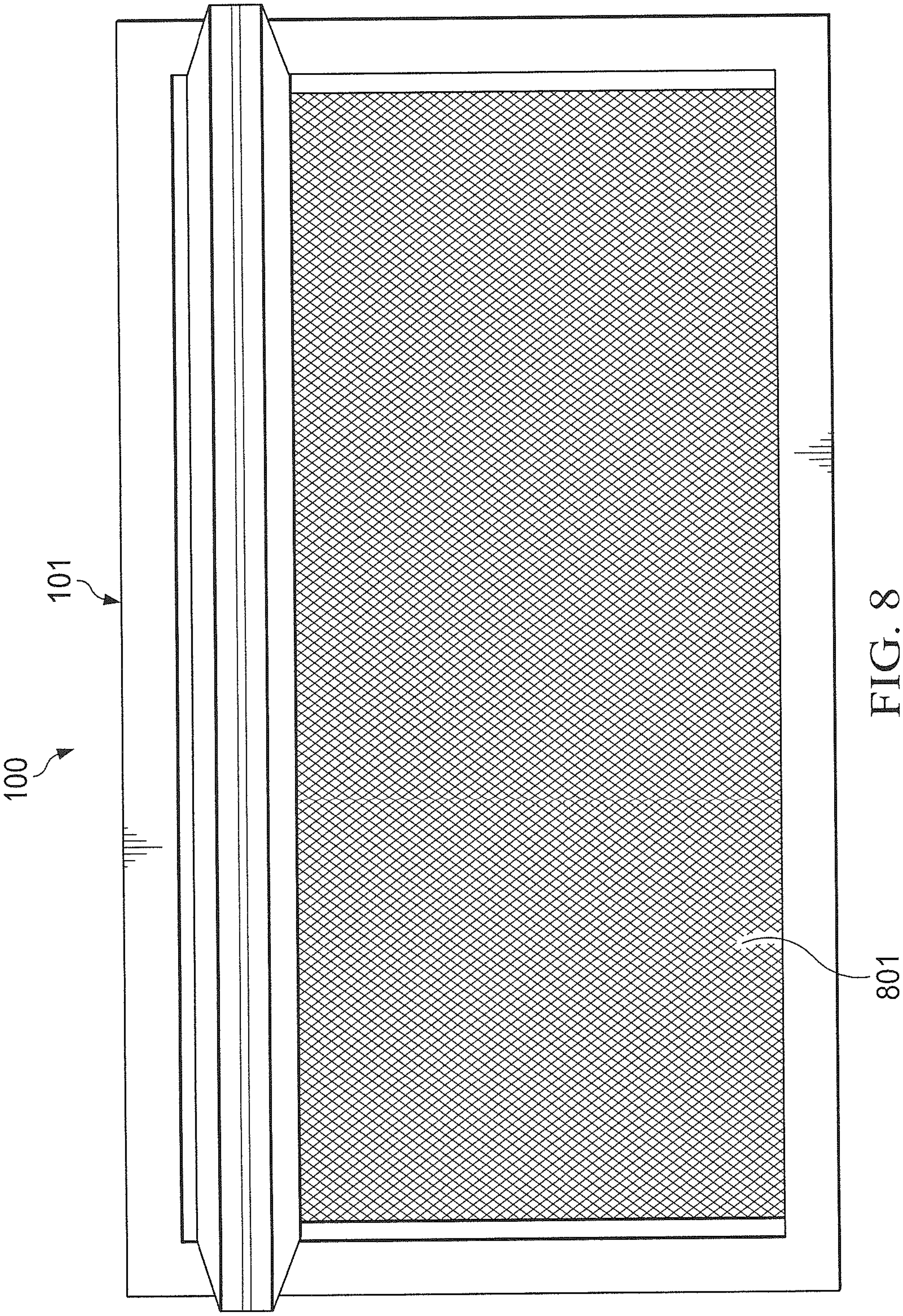
FIG. 8 is a front view of the invention in the open position showing the screen.

FIG. 8 is a front view of invention 100 in the open position showing the screen 801 coupled to the rigid outer frame 101.

Figure 9:
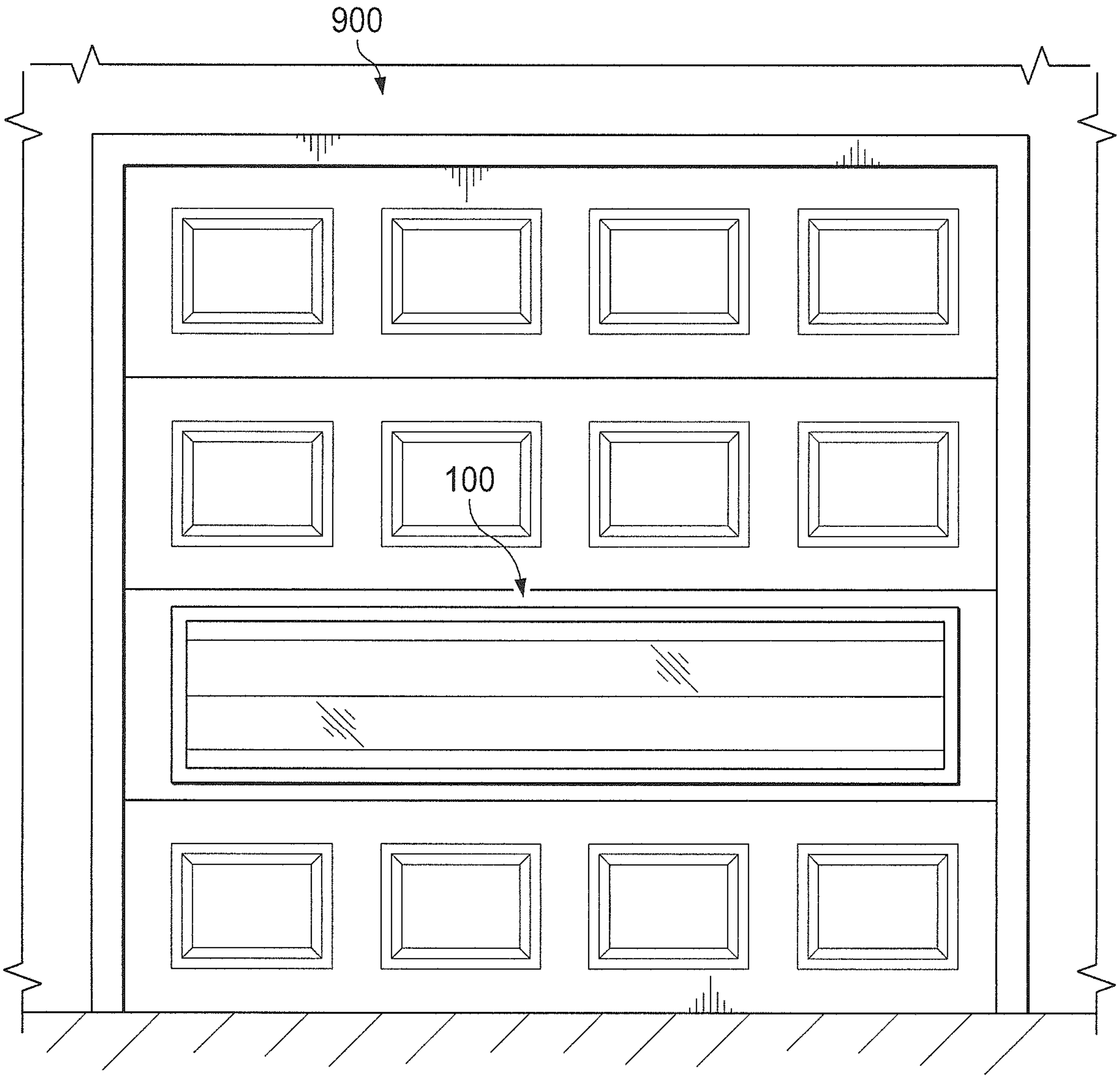
FIG. 9. shows the invention as a single panel in a multi-panel overhead or garage door.

FIG. 9. shows the invention 100 as a single panel in a multi-panel overhead or garage door 900. As seen therein, invention 100 is dimensioned to be a single panel in a multi-panel, overhead or garage door 900. The motion of the panels of an overhead garage door with respect to each other can be described as sequential or cascading. When the door opens, each panel moves along a track in a coordinated manner, folding or rolling upwards until the door is fully open. Similarly, when closing, the panels move downward in a synchronized fashion until the door is closed. This motion is typically guided by hinges and rollers along the tracks, ensuring smooth operation and alignment of the panels throughout the opening and closing process. A screw and nut type system such as a screwjack, screw lift or jackscrew (collectively "screwjack") can be used to move the sub-panels so as to open the invention 100. The screwjack can be manually operated or operated using a motor coupled to the nut or screw. Further, electronic circuitry can be coupled to the motor so as to provide power and remote operation via a wireless or wired controller.

A screwjack, is a mechanical device used to convert rotational motion into linear motion. It consists of a threaded screw or worm and a nut or follower that moves along the screw when it is rotated. The nut typically has a threaded hole that matches the threads of the screw. The screwjack is operated by applying rotational motion to the screw, usually by turning a handle or using a motor. As the screw rotates, the threads on the screw interact with the threads on the nut. This interaction causes the nut to move along the length of the screw. The linear motion of the nut along the screw depends on the pitch of the threads. For each complete revolution of the screw, the nut moves a certain distance along the screw's axis. The nut is typically connected to a load-bearing platform or mechanism. As the nut moves along the screw, it raises or lowers the platform, lifting or lowering the load. Screwjacks provide a mechanical advantage, allowing a relatively small input force to lift heavy loads. This is achieved by the ratio of the screw's pitch diameter to its lead (the linear distance traveled by the nut for one complete revolution of the screw).

The invention 100 is a panel in an overhead door system, comprising a rigid outer frame 101 with an aperture 201 therethrough dimensioned to receive a plurality of movable, foldable horizontally hinged sub-panels 102A, 102B, 103A, 103B dimensioned to fit within the aperture of such outer frame when closed; and a plurality of movable, foldable horizontally hinged sub-panels dimensioned to fit within the aperture of such outer frame when closed, said sub-panels being an upper sub-panel, a first sub-panel, a second subpanel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel.

The invention further comprises a horizontal hinge coupling a first sub-panel to a second sub-panel wherein the hinge is one selected from the group consisting of: a flexible, resilient plastic, a flexible resilient rubber compound, one or more piano hinges, one or more continuous hinges, one or more continuous piano hinges, one or more continuous geared hinges, one or more butt hinges, one or more strap hinges, one or more barrel hinges and one or more hidden hinges.

The upper sub-panel is coupled to the rigid outer frame via a first rotatable coupler that couples a left side of the upper sub-panel to a left vertical member of the rigid outer frame and a second rotatable coupler that couples a right side of the upper sub-panel to a right vertical member of the rigid outer frame. The first rotatable coupler is a pin extending from the left side of upper sub-panel into an aperture proximate an upper end of the left vertical member of the rigid outer frame and wherein the second rotatable coupler is a pin extending from the right side of upper sub-panel into an aperture proximate an upper end of the right vertical member of the rigid outer frame.

The first rotatable coupler and the second rotatable coupler are operable to allow the upper sub-panel and hence the first sub-panel to articulate with respect to the rigid outer frame.

Further, a first lower pin or roller extends from the right side of the lower sub-panel and a second lower pin or roller extends from the left side of the lower side panel, the first lower pin or roller being confined within a track or rail integrated into or coupled to the left side of the outer rigid frame and the second lower pin or roller being confined within a track or rail integrated into or coupled to the right side of the rigid frame.

The first lower pin or roller and corresponding track or rail and the second lower pin or roller and corresponding track or rail are operable to allow the lower sub-panel and hence second sub-panel to move with respect to the rigid outer frame. The horizontal hinge is operable to permit the sub-panels to articulate with respect to each other.

In operation, when the lower sub-panel is moved in an upward motion via the interaction of the first lower pin or roller within its corresponding track or rails and the second lower pin or roller within its corresponding track or rails, it causes a repositioning of the first sub-panel with respect to second sub-panel such that they fold.

The upper sub-panel can be integrated with the first sub-panel and the lower sub-panel can be integrated with the second sub-panel. This panel is or can be combined with a screen that couples to the outer rigid frame and covers the aperture. Either of the first sub-panel and the second sub-panel can be comprised of a solar transducer, clear glass or made of an opaque material.

The invention is further a ventilating panel of a plurality of panels in a residential garage door, comprising a rigid outer frame with an aperture therethrough dimensioned to receive a plurality of movable, foldable horizontally hinged sub-panels dimensioned to fit within the aperture of such outer frame when closed, a screen coupled to the rigid outer frame operable to cover the aperture and a plurality of movable, foldable horizontally hinged sub-panels dimensioned to fit within the aperture of such outer frame when closed, said sub-panels being an upper sub-panel, a first sub-panel, a second sub-panel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel. A horizontal hinge couples a first sub-panel to a second sub-panel wherein the hinge is one selected from the group consisting of: a flexible, resilient plastic, a flexible resilient rubber compound, one or more piano hinges, one or more continuous hinges, one or more continuous piano hinges, one or more continuous geared hinges, one or more butt hinges, one or more strap hinges, one or more barrel hinges and one or more hidden hinges.

The upper sub-panel is coupled to the rigid outer frame via a first rotatable coupler that couples a left side of the upper sub-panel to a left vertical member of the rigid outer frame and a second rotatable coupler that couples a right side of the upper sub-panel to a right vertical member of the rigid outer frame wherein the first rotatable coupler is a pin extending from the left side of upper sub-panel into an aperture proximate an upper end of the left vertical member of the rigid outer frame and wherein the second rotatable coupler is a pin extending from the right side of upper sub-panel into an aperture proximate an upper end of the right vertical member of the rigid outer frame and wherein the first rotatable coupler and the second rotatable coupler are operable to allow the upper sub-panel and hence the first sub-panel to articulate with respect to the rigid outer frame.

The upper sub-panel can be integrated with the first sub-panel and the lower sub-panel can be integrated with the second sub-panel and either of the first sub-panel and the second sub-panel can be comprised of a solar transducer operable to receive sunlight, transduce sunlight into an electrical potential wherein the angle of the sunlight hitting the first sub-panel or second sub-panel is a function of angle that said sub-panel makes with respect to the rigid outer frame. The invention further comprises a locking mechanism operable to lock the lower sub-panel to the rigid outer frame and a strut coupled from the lower subpanel to the rigid outer frame operable to assist in the opening of the sub-panels. The invention further comprises a screwjack coupled from the rigid outer frame to the lower sub-panel operable to move the sub-panels with respect to each other when rotational force is applied to a worm component.

The invention further is an overhead door garage system, having a plurality of hinged panels operable to move sequentially with respect to each other such that each panel moves along a track in a coordinated manner, folding or rolling upwards until the door is fully open and such panels moving downward in a synchronized fashion until the door is closed, such hinged panels guided by hinges and rollers along the tracks, ensuring smooth operation and alignment of the panels throughout the opening and closing process; and wherein at least one of the panels further comprises a ventilated panel, the ventilated panel having a rigid outer frame with an aperture therethrough dimensioned to receive a plurality of movable, foldable horizontally hinged sub-panels positioned within confines of the aperture of such outer frame when closed; and a plurality of movable, foldable horizontally hinged sub-panels positioned within confines of the aperture of such outer frame when closed, said sub-panels being an upper sub-panel, a first sub-panel, a second sub-panel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel. The ventilated panel further comprises a horizontal lengthwise hinge coupling a first sub-panel to a second sub-panel. The hinge is one selected from the group consisting of a flexible, resilient plastic, a flexible resilient rubber compound, one or more piano hinges, one or more continuous hinges, one or more continuous piano hinges, one or more continuous geared hinges, one or more butt hinges, one or more strap hinges, one or more barrel hinges and one or more hidden hinges.

In a further aspect, the invention allows the subpanels to fold inward into the garage space, ensuring that the garage door can operate normally without any obstruction from the garage door frame or building structure, with the subpanels open. It eliminates the need to close the subpanels before opening or closing the garage door.

This present invention allows homeowners to control and improve the movement and exchange of air in the building or structure. It provides an acceptable degree of security and privacy with customizable aesthetics sub-panels that ca be closed or opened as desired. The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention without departing in any way from the spirit and scope of the invention. For example, the invention shows a single panel having 4 subpanels, but the invention can comprise multiple panels in an overhead door, each such panel having a plurality of subpanels.

What is claimed is:

1. A panel in an overhead door system, comprising:

a rigid outer frame with an aperture therethrough dimensioned to receive a plurality of movable, foldable horizontally hinged sub-panels dimensioned to fit within the aperture of such outer frame when closed; and a plurality of movable, foldable horizontally hinged sub-panels dimensioned to fit within the aperture of such outer frame when closed, said sub-panels being an upper sub-panel, a first sub-panel, a second sub-panel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel, wherein the panel further comprises a horizontal hinge coupling the first sub-panel to the second sub-panel and wherein the upper sub-panel being coupled to the rigid outer frame via a first rotatable coupler that couples a left side of the upper sub-panel to a left vertical member of the rigid outer frame and a second rotatable coupler that couples a right side of the upper sub-panel to a right vertical member of the rigid outer frame.

2. The panel of claim 1, wherein the first rotatable coupler is a pin extending from the left side of upper sub-panel into an aperture proximate an upper end of the left vertical member of the rigid outer frame and wherein the second rotatable coupler is a pin extending from the right side of upper sub-panel into an aperture proximate an upper end of the right vertical member of the rigid outer frame.

3. The panel of claim 2, wherein the first rotatable coupler and the second rotatable coupler are operable to allow the upper sub-panel and hence the first sub-panel to articulate with respect to the rigid outer frame.

4. The panel of claim 3, further comprising a first lower pin or roller extending from the right side of the lower sub-panel and a second lower pin or roller extending from the left side of the lower side panel, the first lower pin or roller being confined within a track or rail integrated into or coupled to the left side of the outer rigid frame and the second lower pin or roller being confined within a track or rail integrated into or coupled to the right side of the rigid frame.

5. The panel of claim 4, wherein the first lower pin or roller and corresponding track or rail and the second lower pin or roller and corresponding track or rail are operable to allow the lower sub-panel and hence second sub-panel to move with respect to the rigid outer frame.

6. The panel of claim 5, wherein the horizontal hinge is operable to permit the sub-panels to articulate with respect to each other.

7. The panel of claim 6, wherein when the lower sub-panel is moved in an upward motion via the interaction of the first lower pin or roller within its corresponding track or rails and the second lower pin or roller within its corresponding track or rails, it causes a repositioning of the first sub-panel with respect to second sub-panel such that they fold.

8. The panel of claim 7, wherein the upper sub-panel is integrated with the first sub-panel and the lower sub-panel is integrated with the second sub-panel.

9. A ventilating panel of a plurality of panels in a residential garage door, comprising:

a rigid outer frame with an aperture therethrough dimensioned to receive a plurality of movable, foldable horizontally hinged sub-panels dimensioned to fit within the aperture of such outer frame when closed;

a screen coupled to the rigid outer frame operable to cover the aperture;

a plurality of movable, foldable horizontally hinged sub-panels dimensioned to fit within the aperture of such outer frame when closed, said sub-panels being an upper sub-panel, a first sub-panel, a second sub-panel and a lower sub-panel, the upper sub-panel coupled along its lower horizontal edge to the top horizontal edge of the first sub-panel, the first sub-panel being coupled along its lower horizontal edge to the top horizontal edge of the second subpanel, and the lower horizontal edge of the second subpanel being coupled to the top horizontal edge of the lower sub-panel;

a horizontal hinge coupling the first sub-panel to the second sub-panel wherein the hinge is one selected from the group consisting of: a flexible, resilient plastic, a flexible resilient rubber compound, one or more piano hinges, one or more continuous hinges, one or more continuous piano hinges, one or more continuous geared hinges, one or more butt hinges, one or more strap hinges, one or more barrel hinges and one or more hidden hinges;

the upper sub-panel being coupled to the rigid outer frame via a first rotatable coupler that couples a left side of the upper sub-panel to a left vertical member of the rigid outer frame and a second rotatable coupler that couples a right side of the upper sub-panel to a right vertical member of the rigid outer frame wherein the first rotatable coupler is a pin extending from the left side of upper sub-panel into an aperture proximate an upper end of the left vertical member of the rigid outer frame and wherein the second rotatable coupler is a pin extending from the right side of upper sub-panel into an aperture proximate an upper end of the right vertical member of the rigid outer frame and wherein the first rotatable coupler and the second rotatable coupler are operable to allow the upper sub-panel and hence the first sub-panel to articulate with respect to the rigid outer frame; and a screwjack coupled from the rigid outer frame to the lower sub-panel operable to move the sub-panels with respect to each other when rotational force is applied to a worm component.

10. The ventilating panel of claim 9, wherein the upper sub-panel is integrated with the first sub-panel and the lower sub-panel is integrated with the second sub-panel; and further comprising a locking mechanism operable to lock the lower sub-panel to the rigid outer frame and a strut coupled from the lower subpanel to the rigid outer frame operable to assist in the opening of the sub-panels.

11. The ventilating panel of claim 9, wherein either of the first sub-panel and the second sub-panel are comprised of a solar transducer operable to receive sunlight, transduce sunlight into an electrical potential and wherein an angle of the sunlight hitting the first sub-panel or second sub-panel is a function of an angle that said sub-panel makes with respect to the rigid outer frame.

* * * * *